Jan. 8, 1952 — L. A. V. ROZAS — 2,581,557
PARACHUTE UNFASTENER
Filed May 10, 1950 — 2 SHEETS—SHEET 2
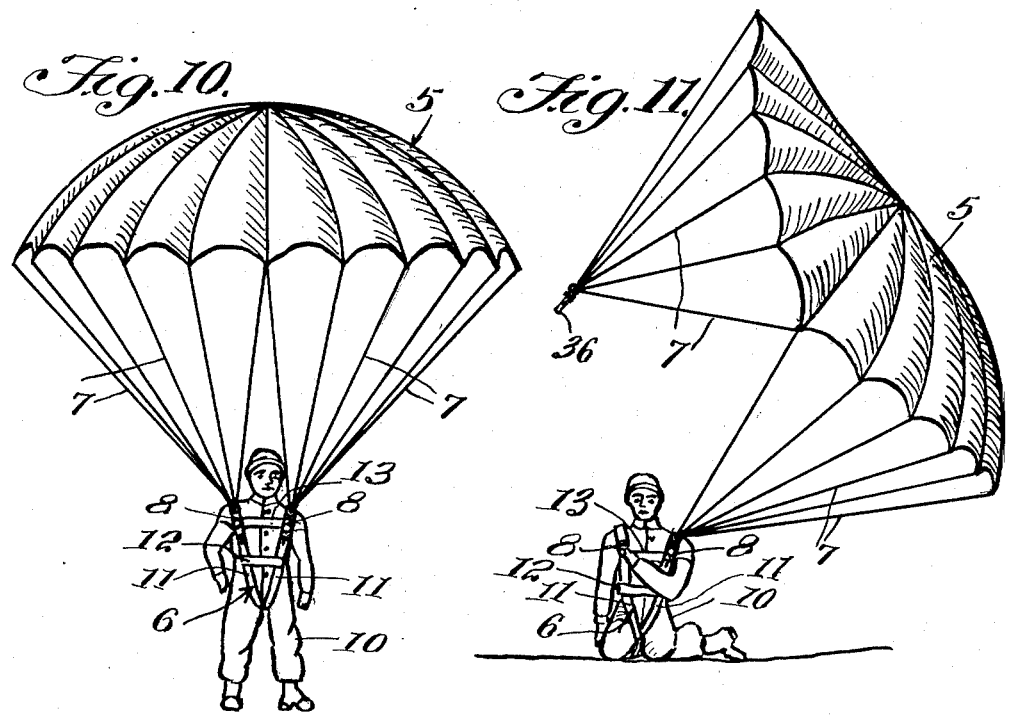
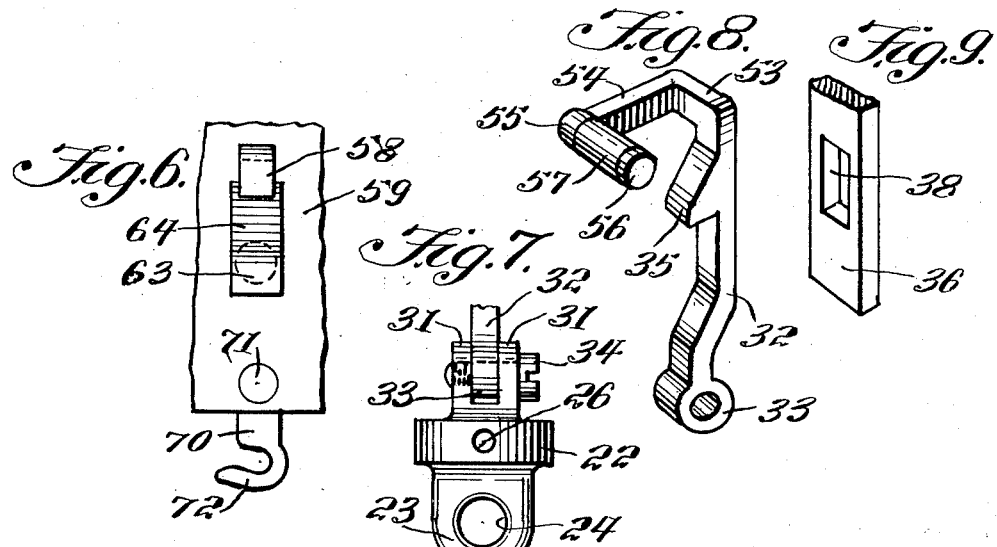
INVENTOR.
Luis Alberto Villafuerte Rozas,
BY Victor J. Evans & Co.
ATTORNEYS Patented Jan. 8, 1952

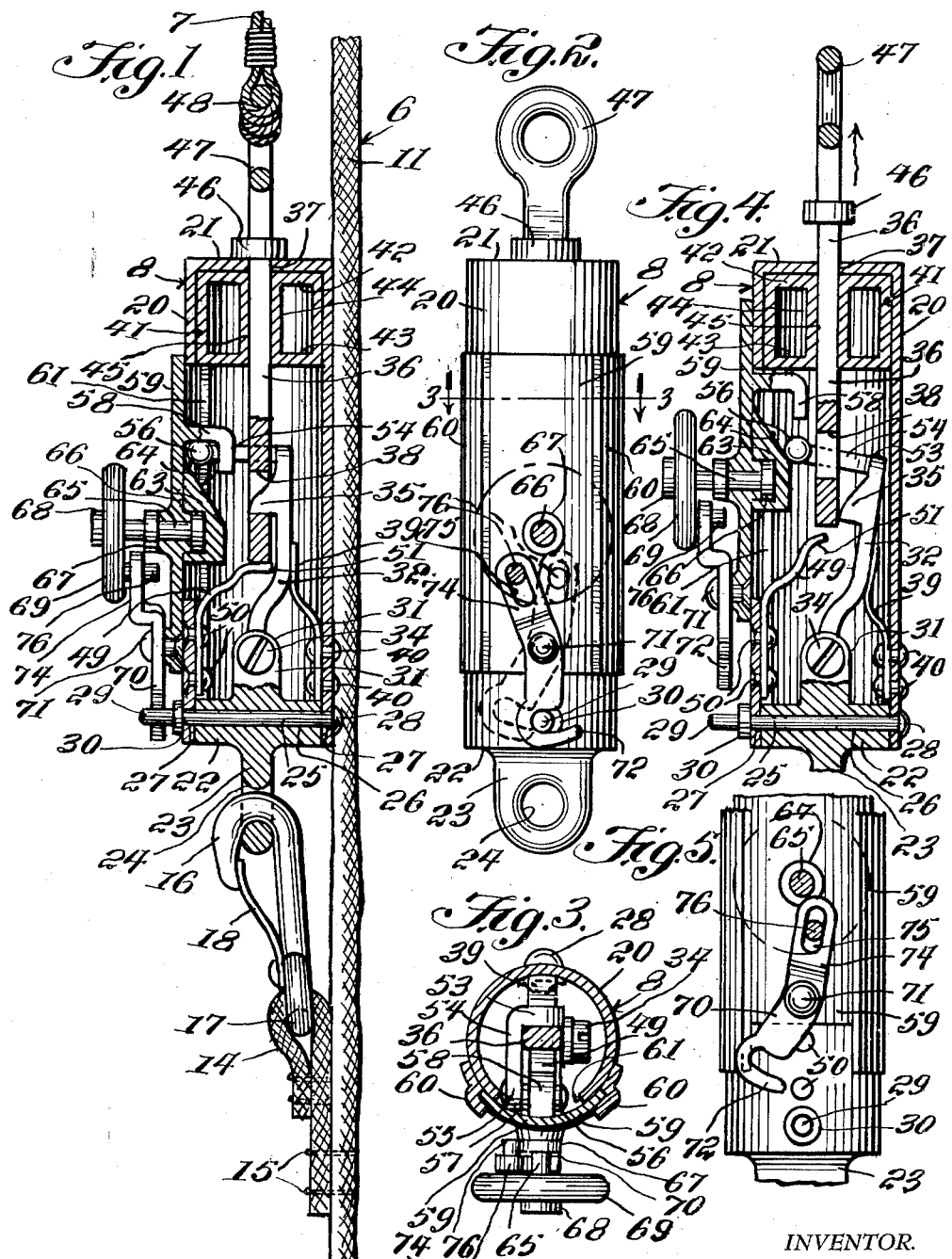

2,581,557

UNITED STATES PATENT OFFICE 2,581,557

PARACHUTE UNFASTENER

Luis Alberto Villafuerte Rozas, Cuzco, Peru

Application May 10, 1950, Serial No. 161,111

3 Claims. (Cl. 294—83.1)

The present invention relates to parachutes and in particular, to a releasable fastener for attaching the parachute to the body harness so that the parachute can be quickly and easily detached when the chutist lands.

One object of the invention is to provide a quick detachable fastener for securing the parachute to the body harness so that the chutist can unfasten the parachute from his harness quickly and conveniently and before the wind has a chance to pull the chutist along the ground, and cause possible bodily injury.

Another object is to provide a releasable fastener for quickly detaching the parachute from the body harness when the chutist lands, and which is within convenient reach of the chutist to facilitate quick and easy detachment and prevent the parachute from dragging the chutist along the ground.

Another object is to provide a quick detachable fastener for connecting a parachute to a body harness which is positively held in place and manually operable to permit the convenient and quick unfastening of the parachute from the harness of the chutist.

Other objects and advantages of the invention will become apparent during the course of the following description of the drawings wherein:

Figure 1 is a vertical cross-sectional view of the releasable fastener showing the manner in which the same is held in a locked position.

Figure 2 is a front elevational view of the detachable fastener showing the latch holding member in its locked position and the manner in which it can be swung or rocked to a position of release by manipulating the hand control (dotted lines).

Figure 3 is a horizontal cross-sectional view taken on line 3—3 of Figure 2 and looking in the direction of the arrows, to illustrate the sliding latch release and the offset keeper arm carried by the latch member.

Figure 4 is a vertical cross-sectional view similar to Figure 1, but showing the parts in their unlatched position.

Figure 5 is a fragmentary front elevational view similar to Figure 2, but showing the latch retaining slide in its uppermost position corresponding to its position in Figure 4.

Figure 6 is a fragmentary internal view of the latch retaining slide showing the keeper thereon for retaining the latch in its locked position.

Figure 7 is a fragmentary side elevational view of the closure plug for the lower end of the latch or detachable fastener and illustrating the pivotal connection between the latch member and the closure plug.

Figure 8 is a perspective view of the latch member showing the offset arm thereon which is adapted to be held in place and interlockingly engaged by the keeper member on the control slide.

Figure 9 is a fragmentary perspective view of the releasable strap to which the parachute cords are affixed to the upper end, and showing the keeper opening in the lower end for being releasably engaged by the latch member.

Figure 10 is a front elevational view of the device illustrating the manner in which the same is employed for detachably connecting the cords of a parachute to the body harness and Figure 11 is a view similar to Figure 10 showing the manner in which the parachute can be released and unfastened from the body harness when the chutist lands.

In the drawings, and more in detail, there is shown for the purpose of convenience of illustration (Figures 10 and 11) a conventional parachute generally designated 5 which is releasably connected to a harness likewise generally designated 6 by the usual cords generally designated 7. The invention consists in providing a releasable fastener generally designated 8 for detachably fastening the parachute cords 7 to the harness 6 such that the chutist 10 may quickly and easily unfasten the parachute when he lands (Figure 11).

The harness and parachute are of the back-type, and the harness 6 includes a pair of straps 11 which pass over the shoulders and beneath the crotch and are held in place by waist and chest straps 12 and 13 respectively (Figure 10). The harness straps 11 are usually formed of leather or similar material and are provided with looped straps 14 held in place by multiple rows of stitching 15. A hook 16 has its eye 17 secured in place by the loop 14 and a guard 18 of resilient metal is provided to protect the hook 16.

The detachable fastener 8 is adapted to be interposed between the hook 16 and the parachute cords 7 of a conventional back type parachute in which the parachute 5 is folded and pleated and stored on the back of the chutist 10.

The releasable fastener 8 includes a cylindrical member 20 having the upper end closed by an end wall 21, and the lower end closed by means of a closure plug 22. The closure plug 22 has formed integral therewith a projection 23 having an opening 24 for receiving the hook 16 and said closure plug is adapted to be held in place in the lower end of the cylinder 20 by means of a pin 25 which passes through a diametrical opening 26 in the closure plug and also through correspondingly positioned openings 27 in the lower edge of the cylinder 20. One end of the pin is provided with a head, and the opposite end from the head 28 projects beyond the peripheral wall of the cylinder to form a latch engaging projection 29. If desired a portion of the pin may be threaded to receive a threaded fastener 30 or said pin may be held in place by a washer frictionally held in position.

The inner wall of the closure plug 22 is provided with a boss having a central slot to form a pair of spaced apart ears 31 between which is pivotally mounted a latch member 32. The lower end of the latch member is offset and shaped to provide a cylindrical bearing 33 through which a pivot bolt 34 is passed (Figures 7 and 8). The latch bar 32 is provided with a hook 35 which is adapted to releasably engage a latch bar 36, which is slidably mounted in the opening 37 in the top wall 21 of the fastener 8. The hook 35 being received in a keeper opening 38 in the sliding latch bar 36. A leaf spring 39 has one end affixed to the cylinder 20 by means of rivets 40, while the opposite end is presented to the latch bar 32 to normally yieldingly urge the hooked end 35 of the latch member 32 into locking engagement with the keeper opening 38.

The slot or opening 37 for slidably receiving the latch bar 36 is re-inforced by means of a cylindrical guide member 41 having the top and bottom walls thereof as at 42 and 43 connected by a guide sleeve 44, which is provided with an opening 45 corresponding in shape to the section of the latch bar 36 and likewise to the shape of the opening 37. An enlarged limiting stop 46 is formed on the latch bar and an eye 47 is formed at the upper end thereof for receiving the looped ends 48 of the parachute cords 7. A leaf spring 49 similar to the spring 39 is affixed to the lower end of the cylinder 20 by rivets or the like 50, and said leaf spring is shaped to provide an end portion 51 adapted to yieldingly engage the lower end of the latch bar 36 and normally urge the same upwardly against the hooked end 35 of the latch member 32.

Formed on the latch member 32 at the upper end thereof is an offset portion 53 which is bent angularly (Figure 8) to provide an offset arm 54. The free end of the arm is enlarged as at 55 and is provided with a pin 56 on which is mounted a rotatable sleeve 57. The pin 56 and sleeve 57 are adapted to be engaged by means of a hooked keeper member 58 extending inwardly from a slide 59 which is arcuately curved and has its ends or vertical edges slidably received in ways 60 secured to opposite sides of a vertical slot 61 in the cylinder 20. Thus, by moving the arcuate slide to and fro the keeper hook 58 will engage and disengage the pin 56 and retain the hook 35 in the keeper opening 38 of the latch bar 36 or will allow the same to be released.

Also formed on the inner wall of the arcuately curved sliding plate 59 is an enlarged boss 63 having an inclined surface 64 which is adapted to engage the pin 56 when the slide 59 is raised or moved in a vertical direction to disengage the latch hook 35 from the keeper opening 38 of the latch bar 36, (Figure 4), to thereby release said latch bar and permit the same to be moved upwardly under the influence of the force exerted thereon and the yielding force exerted by the leaf spring 51.

Journaled in the enlarged boss 63 is a rotatable pin 65 having an enlarged head 66 which is rotatably mounted in a correspondingly shaped opening in the boss 63. The pin 65 is also provided with an enlarged annular portion 67 and secured to the outer end thereof is the hub 68 of a manual control hand wheel 69. The manual control hand wheel 69 can also be used to move the slide to and fro on its ways 60 so that the hooked shaped keeper 58 and projection 63 will operate in the longitudinal slot 61 of the cylinder 20 and engage and disengage the pin 56 for controlling the movement of the latch member 32.

The slide 59 is adapted to be held in its lowermost position by means of a pivoted hasp 70 which is rockably mounted on the lower end of the arcuately curved slide 59 by means of a pivot pin 71, and said hasp 70 has its lower end formed to provide a hook 72 which is adapted to engage the projecting portion 29 of the pin 25 at the extreme lower portion of the cylinder 20. The upper end of the hasp lever 70 is offset as at 74 and is provided with an elongated slot 75 for receiving a pin 76 secured to the manual control handle 69. Thus, rotation of the manual control handle 69 will rock the hasp lever 70 on its pivot pin 71 and move the hooked end 72 thereof into and out of engagement with the pin 29 (Figure 2) to fasten and release said sliding plate 59.

In operation, the parachute cords 7 are attached to the latch bar 36 and the detachable fastener cylinders 20 are connected to the hooks 16 of each shoulder strap 11. The latch bar 36 is then inserted in the opening 37 so that the hook 35 engages the keeper opening 38. The slide 59 is then moved downwardly to engage the hooked keeper 58 with the pin 56 and the manual control 69 is rotated or angularly displaced to rock the hasp lever 70 and cause the hooked end 72 to engage the pin 29 (Figure 2).

The paratchute 5 is stored on the back of the chutist 10 in the usual manner, and when the chutist bails out of the plane the parachute opens as shown in Figure 10. When the chutist reaches the ground (Figure 11), he manipulates the manual control wheel 69 to first release the hasp 70 from engagement with the pin 29 so that the pull force on the slide 59 will be released. By then moving the slide 59 upwardly the hooked keeper 58 will disengage the pin 56 and the inclined surface 64 of the projection 63 will engage the pin 56 and cause the hook 35 of the latch member 32 to be moved out of engagement with the keeper opening 38 of the latch bar 36 against the yielding action of the leaf spring 39. The latch bar 36 is then displaced by the yielding force exerted on the lower end thereof by the leaf spring 51, so that said latch bar 36 and the cords 7 of the parachute 5 will be released from the fastener 8 when the chutist reaches the ground (Figure 11).

If desired, only one of the releasable fasteners 8 may be released as shown in Figure 11 to permit the air beneath the parachute 5 to escape and prevent the wind from dragging the chutist 10 along the ground surface, thus permitting the parachute 5 to be still held by the chutist without the liability of being dragged along the ground surface by the wind.

It is to be understood that the form of the invention herewith shown and described is to be taken as a preferred embodiment thereof and that various changes in the shape, size and arrangement of parts may be resorted to without departing from the spirit of the invention or the scope of the subjoined claims.

I claim:

1. In combination with a parachute having a body harness, a separable fastener interposed between said parachute and harness comprising a cylindrical member affixed to one of the straps of the body harness having a slot in one of its closed ends, a latch bar removably mounted in said slot having an eye for receiving the cords of the parachute, a pivoted latch member within said cylindrical member having a hooked end adapted to engage a keeper opening in said latch bar, a slide on said cylindrical member, means on said slide to engage said pivoted latch bar and retain the same in its locked position, means on said slide to engage said pivoted latch bar to disengage said pivoted latch bar from said sliding latch bar, and manually controlled latch means on said slide to prevent to and fro movement thereof.

2. In combination with a parachute and body harness, a separable fastener for releasably connecting said parachute to said harness comprising a cylindrical member affixed to one of the straps of said latch member having a slot in one of its closed ends, a latch bar having an eye at one end adapted to be received in said slot, the cords of said parachute being connected to said eye, a pivoted latch mounted in said cylindrical member having a hooked end for being received in a keeper slot in said latch bar, an extension on said pivoted latch projecting laterally of said pivoted latch, yielding spring means for urging said pivoted latch into engagement with said latch bar, a slide on said cylinder having a hooked projection for releasably engaging said pivoted latch extension to hold said pivoted latch in engagement with said latch bar, a projection adjacent said hooked projection for engaging said extension to release said hooked end of the pivoted latch from engagement with said latch bar and a lock on said slide to hold said slide against to and fro movement.

3. In combination with a parachute and body harness, a separable fastener for releasably connecting said parachute to said harness comprising a cylindrical member affixed to one of the straps of said latch member having a slot in one of its closed ends, a latch bar having an eye at one end adapted to be received in said slot, the cords of said parachute being connected to said eye, a pivoted latch mounted in said cylindrical member having a hooked end for being received in a keeper slot in said latch bar, an extension on said pivoted latch projecting laterally of said pivoted latch, yielding spring means for urging said pivoted latch into engagement with said latch bar, a slide on said cylinder having a hooked projection for releasably engaging said pivoted latch extension to hold said pivoted latch in engagement with said latch bar, a projection adjacent said hooked projection for engaging said extension to release said hooked end of the pivoted latch from engagement with said latch bar, a latch on said slide to hold said slide against to and fro movement, and a manual control on said slide for operating the latch on said slide and facilitating to and fro movement of said slide when the latch on said slide is released.

LUIS ALBERTO VILLAFUERTE ROZAS.

REFERENCES CITED

The following references are of record in the file of this patent:

UNITED STATES PATENTS

| Number | Name | Date |
| --- | --- | --- |
| 2,328,914 | Kubat | Sept. 7, 1943 |